(12) United States Patent
Sridharan et al.

(10) Patent No.: US 11,184,129 B2
(45) Date of Patent: Nov. 23, 2021

(54) SOUNDING REFERENCE SIGNAL CONFIGURATIONS TO SUPPORT UPLINK TRANSMISSIONS WITH CYCLIC DELAY DIVERSITY

(71) Applicant: QUALCOMM Incorporated, San Diego, CA (US)

(72) Inventors: Gokul Sridharan, San Diego, CA (US); Yi Huang, San Diego, CA (US); Xiao Feng Wang, San Diego, CA (US); Wei Yang, San Diego, CA (US); Jay Kumar Sundararajan, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 244 days.

(21) Appl. No.: 16/575,976

(22) Filed: Sep. 19, 2019

(65) Prior Publication Data

US 2020/0099490 A1 Mar. 26, 2020

Related U.S. Application Data

(60) Provisional application No. 62/734,727, filed on Sep. 21, 2018.

(51) Int. Cl.
*H04L 5/00* (2006.01)
*H04B 7/06* (2006.01)

(52) U.S. Cl.
CPC ......... *H04L 5/0048* (2013.01); *H04B 7/0671* (2013.01); *H04L 5/0007* (2013.01)

(58) Field of Classification Search
CPC ............... H04B 7/0404; H04B 7/0456; H04B 7/046–0486; H04B 7/0671;
(Continued)

(56) References Cited

U.S. PATENT DOCUMENTS 8,792,584 B2 * 7/2014 Koo ................... H04L 27/2613
375/299
9,497,006 B2 11/2016 Chung et al.
(Continued)

FOREIGN PATENT DOCUMENTS

WO 2018056789 A1 3/2018

OTHER PUBLICATIONS

Dahlman et al. "Codebook Based Precoding—an Overview," ScienceDirect, https://www.sciencedirect.com/topics/engineering/codebood-based-precoding, accessed Jun. 11, 2021, pp. 1-15 (Year: 2021).*

(Continued)

*Primary Examiner* — Thomas R Cairns
(74) *Attorney, Agent, or Firm* — Harrity & Harrity, LLP

(57) ABSTRACT

Various aspects of the present disclosure generally relate to wireless communication. In some aspects, a user equipment (UE) may receive an indication of a sounding reference signal (SRS) resource set to be used to signal a virtual port used for a physical uplink shared channel (PUSCH) communication, wherein the virtual port is a combination of at least two non-coherent or partially-coherent antenna ports of the UE using precoding and cyclic delay diversity; and transmit an SRS for the at least two non-coherent or partially-coherent antenna ports using one or more resources of the SRS resource set. Numerous other aspects are provided.

42 Claims, 10 Drawing Sheets

(58) Field of Classification Search
CPC ............... H04L 5/0005; H04L 5/0007; H04L 5/0008–001; H04L 5/0023; H04L 5/0025; H04L 5/0044; H04L 5/0046; H04L 5/0048; H04L 5/005–0051; H04L 5/006; H04L 5/0082; H04L 5/0083; H04L 5/0091; H04L 5/0092; H04L 5/0098; H04L 5/1469; H04L 5/1476–1492; H04L 27/2608; H04L 27/261; H04L 27/2611; H04L 27/262

See application file for complete search history.

(56) References Cited

U.S. PATENT DOCUMENTS

| | | | | |
|---|---|---|---|---|
| 10,212,676 | B2* | 2/2019 | Lee | H04L 5/0048 |
| 10,958,321 | B2* | 3/2021 | Park | H04B 7/0404 |
| 10,980,066 | B2* | 4/2021 | Kim | H04W 72/042 |
| 2014/0112168 | A1 | 4/2014 | Chen et al. | |
| 2017/0353931 | A1 | 12/2017 | Stern-Berkowitz et al. | |
| 2018/0048365 | A1 | 2/2018 | Yoo et al. | |
| 2018/0167252 | A1 | 6/2018 | Wang et al. | |
| 2020/0204224 | A1* | 6/2020 | Kang | H04L 5/0094 |

OTHER PUBLICATIONS

Intel, "Summary on Codebook Based UL Transmission," 3GPP TSG RAN WG1 Meeting #93, R1-1807669, Busan, Korea, May 21-25, 2018, pp. 1-18 (Year: 2018).*
NTT DOCOMO: "SRS Enhancement for Elevation BF and FD-MIMO", 3GPP TSG RAN WG1 Meeting #82, R1-154663, 3rd Generation Partnership Project (3GPP), Mobile Competence Centre; 650, Route Des Lucioles F-06921 Sophia-Antipolis Cedex; France, vol. RAN WG1, No. Beijing, China; Aug. 24, 2015-Aug. 28, 2015; Aug. 23, 2015 (Aug. 23, 2015), 3 Pages, XP051039542, Retrieved from the Internet: URL:http://www.3gpp.org/ftp/Meetings_3GPP_SYNC/RAN1/Docs/ [retrieved on Aug. 23, 2015], Sections 1, 2.1, 2.2.
Partial International Search Report—PCT/US2019/052175—ISA/EPO—dated Jan. 14, 2020.
Qualcomm Incorporated: "Discussion on SRS Design," 3GPP TSG RAN WG1 Meeting #89, 3GPP Draft R1-1708600, 3rd Generation Partnership Project (3GPP), Mobile Competence Centre; 650, Route Des Lucioles F-06921, Sophia-Antipolis Cedex; France, vol. RAN WG1, No. Hangzhou, China; May 15, 2017-May 19, 2017, May 14, 2017, XP051273791, 11 pages, Retrieved from the Internet: URL: http://www.3gpp.org/ftp/Meetings_3GPP_SYNC/RAN1/Docs/ [retrieved on May 14, 2017], sections 1,2.1 ,2.2, 2.4, 2.5, 2.7-2.9.
ZTE: "Diversity Based Uplink Transmission Schemes", 3GPP TSG RAN WG1 Meeting #90, 3GPP Draft; R1-1712287 Diversity Based Uplink Transmission Schemes, 3rd Generation Partnership Project (3GPP), Mobile Competence Centre, 650, Route Des Lucioles ; F-06921 Sophia-Antipolis Cedex, France, vol. RAN WG1, No. Prague, Czech Republic; Aug. 21, 2017-Aug. 25, 2017, Aug. 20, 2017 (Aug. 20, 2017), pp. 1-6, XP051315103, Retrieved from the Internet: URL: http://www.3gpp.org/ftp/Meetings_3GPP_SYNC/RAN1/Docs/ [retrieved on Aug. 20, 2017], Figure 1, Sections 1, 2, 2.1, 2.2.
Intel Corporation: "Summary on Codebook Based UL Transmission", 3GPP TSG RAN WG1 Meeting #93, R1-180xxxx, Busan, Korea, May 21-25, 2018, pp. 1-15.
CATT: "Discussion on Remaining Details of Non-Codebook Based Transmission", 3GPP Draft, 3GPP TSG RAN WG1 Meeting 91, R1-1720179, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 27, 2017-Dec. 1, 2017, Nov. 18, 2017 (Nov. 18, 2017), XP051369815, 6 Pages, Retrieved from the Internet: URL: http://www.3gpp.org/ftp/tsg%5Fran/WG1%5FRL1/TSGR1%5F91/Docs/, [retrieved on Nov. 18, 2017] sections 1, 2.1-2.3.
CATT: "Issues on Reference Signals", 3GPP Draft, 3GPP TSG RAN WG1 Meeting #94, R1-1808376, 3rd Generation Partnership Project (3GPP), Mobile Competence Centre, 650, Route Des Lucioles, F-06921 Sophia-Antipolis Cedex, France, vol. Ran WG1, No. Gothenburg, Sweden, Aug. 20, 2018-Aug. 24, 2018, Aug. 11, 2018 (Aug. 11, 2018), XP051515758, 7 Pages, Retrieved from the Internet: URL: http://www.3gpp.org/ftp/tsg%5Fran/WG1%5FRL1/TSGR1%5F94/Docs/R1%2D1808376%2Ezip, [retrieved on Aug. 11, 2018], Sections 6.2.1, 6.2.1.3.
Huawei, et al., "UL SRS Design for Beam Management and CSI Acquisition", 3GPP Draft, 3GPP TSG RAN WG1 Meeting #90, R1-1712238, 3rd Generation Partnership Project (3GPP), Mobile Competence Centre, 650, Route Des Lucioles, F-06921 Sophia-Antipolis Cedex, France, vol. RAN WG1, No. Prague, Czech Republic, Aug. 21, 2017-Aug. 25, 2017, Aug. 20, 2017 (Aug. 20, 2017), XP051315055, 12 Pages, Retrieved from the Internet: URL: http://www.3gpp.org/ftp/Meetings_3GPP_SYNC/RAN1/Docs/, [retrieved on Aug. 20, 2017], figures 6, 7, Sections 1, 2.1.2, 2.2.2, 2.2.3, 2.3, 2.5.
Huawei, et al., "UL SRS Design for Beam Management and CSI Acquisition", 3GPP Draft, 3GPP TSG RAN WG1 NR Ad Hoc Meeting, R1-1715474, 3rd Generation Partnership Project (3GPP), Mobile Competence Centre, 650, Route Des Lucioles, F-06921 Sophia-Antipolis Cedex, France, vol. RAN WG1, No. Nagoya, Japan, Sep. 18, 2017-Sep. 21, 2017, Sep. 17, 2017 (Sep. 17, 2017), XP051338942, 16 Pages, Retrieved from the Internet: URL: http://www.3gpp.org/ftp/Meetings_3GPP_SYNC/RAN1/Docs/, [retrieved on Sep. 17, 2017], figures 6, 7, Sections 1, 2.1.1, 2.1.2.4, 2.2.2, 2.3, 2.4.
International Search Report and Written Opinion—PCT/US2019/052175—ISAEPO—dated May 7, 2020.

* cited by examiner

SOUNDING REFERENCE SIGNAL CONFIGURATIONS TO SUPPORT UPLINK TRANSMISSIONS WITH CYCLIC DELAY DIVERSITY

CROSS-REFERENCE TO RELATED APPLICATION

This application claims priority to U.S. Provisional Patent Application No. 62/734,727, filed on Sep. 21, 2018, entitled "SOUNDING REFERENCE SIGNAL CONFIGURATIONS TO SUPPORT UPLINK TRANSMISSIONS WITH CYCLIC DELAY DIVERSITY," which is hereby expressly incorporated by reference herein.

FIELD OF THE DISCLOSURE

Aspects of the present disclosure generally relate to wireless communication and to techniques and apparatuses for sounding reference signal configurations to support uplink transmissions with cyclic delay diversity.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a g Node B (gNB), an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving an indication of a sounding reference signal (SRS) resource set to be used to signal a virtual port used for a physical uplink shared channel (PUSCH) communication, wherein the virtual port is a combination of at least two non-coherent or partially-coherent antenna ports of the UE using precoding and cyclic delay diversity; and transmitting an SRS for the at least two non-coherent or partially-coherent antenna ports using one or more resources of the SRS resource set.

In some aspects, a UE for wireless communication may include memory and one or more processors operatively coupled to the memory. The memory and the one or more processors may be configured to receive an indication of a sounding reference signal (SRS) resource set to be used to signal a virtual port used for a physical uplink shared channel (PUSCH) communication, wherein the virtual port is a combination of at least two non-coherent or partially-coherent antenna ports of the UE using precoding and cyclic delay diversity; and transmit an SRS for the at least two non-coherent or partially-coherent antenna ports using one or more resources of the SRS resource set.

In some aspects, a non-transitory computer-readable medium may store one or more instructions for wireless communication. The one or more instructions, when executed by one or more processors of a UE, may cause the one or more processors to receive an indication of a sounding reference signal (SRS) resource set to be used to signal a virtual port used for a physical uplink shared channel (PUSCH) communication, wherein the virtual port is a combination of at least two non-coherent or partially-coherent antenna ports of the UE using precoding and cyclic delay diversity; and transmit an SRS for the at least two non-coherent or partially-coherent antenna ports using one or more resources of the SRS resource set.

In some aspects, an apparatus for wireless communication may include means for receiving an indication of a sounding reference signal (SRS) resource set to be used to signal a virtual port used for a physical uplink shared channel (PUSCH) communication, wherein the virtual port is a combination of at least two non-coherent or partially-coherent antenna ports of the apparatus using precoding and cyclic delay diversity; and means for transmitting an SRS for the at least two non-coherent or partially-coherent antenna ports using one or more resources of the SRS resource set.

In some aspects, a method of wireless communication, performed by a UE, may include determining that the UE is configured to use a virtual port for a physical uplink shared channel (PUSCH) communication, wherein the virtual port is a combination of at least two non-coherent or partially-coherent antenna ports of the UE using precoding and cyclic delay diversity; determining that the UE is configured with a first sounding reference signal (SRS) resource set that overlaps in time with a second SRS resource set, wherein the first SRS resource set and the second SRS resource set are associated with different uses; and transmitting an SRS for the at least two non-coherent or partially-coherent antenna ports using one or more resources of the second SRS resource set or a third SRS resource set configured for the UE.

In some aspects, a UE for wireless communication may include memory and one or more processors operatively coupled to the memory. The memory and the one or more processors may be configured to determine that the UE is configured to use a virtual port for a physical uplink shared channel (PUSCH) communication, wherein the virtual port is a combination of at least two non-coherent or partially-coherent antenna ports of the UE using precoding and cyclic delay diversity; determine that the UE is configured with a first sounding reference signal (SRS) resource set that overlaps in time with a second SRS resource set, wherein the first SRS resource set and the second SRS resource set are associated with different uses; and transmit an SRS for the at least two non-coherent or partially-coherent antenna ports using one or more resources of the second SRS resource set or a third SRS resource set configured for the UE.

In some aspects, a non-transitory computer-readable medium may store one or more instructions for wireless communication. The one or more instructions, when executed by one or more processors of a UE, may cause the one or more processors to determine that the UE is configured to use a virtual port for a physical uplink shared channel (PUSCH) communication, wherein the virtual port is a combination of at least two non-coherent or partially-coherent antenna ports of the UE using precoding and cyclic delay diversity; determine that the UE is configured with a first sounding reference signal (SRS) resource set that overlaps in time with a second SRS resource set, wherein the first SRS resource set and the second SRS resource set are associated with different uses; and transmit an SRS for the at least two non-coherent or partially-coherent antenna ports using one or more resources of the second SRS resource set or a third SRS resource set configured for the UE.

In some aspects, an apparatus for wireless communication may include means for determining that the apparatus is configured to use a virtual port for a physical uplink shared channel (PUSCH) communication, wherein the virtual port is a combination of at least two non-coherent or partially-coherent antenna ports of the apparatus using precoding and cyclic delay diversity; means for determining that the apparatus is configured with a first sounding reference signal (SRS) resource set that overlaps in time with a second SRS resource set, wherein the first SRS resource set and the second SRS resource set are associated with different uses; and means for transmitting an SRS for the at least two non-coherent or partially-coherent antenna ports using one or more resources of the second SRS resource set or a third SRS resource set configured for the apparatus.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

Figure 1:
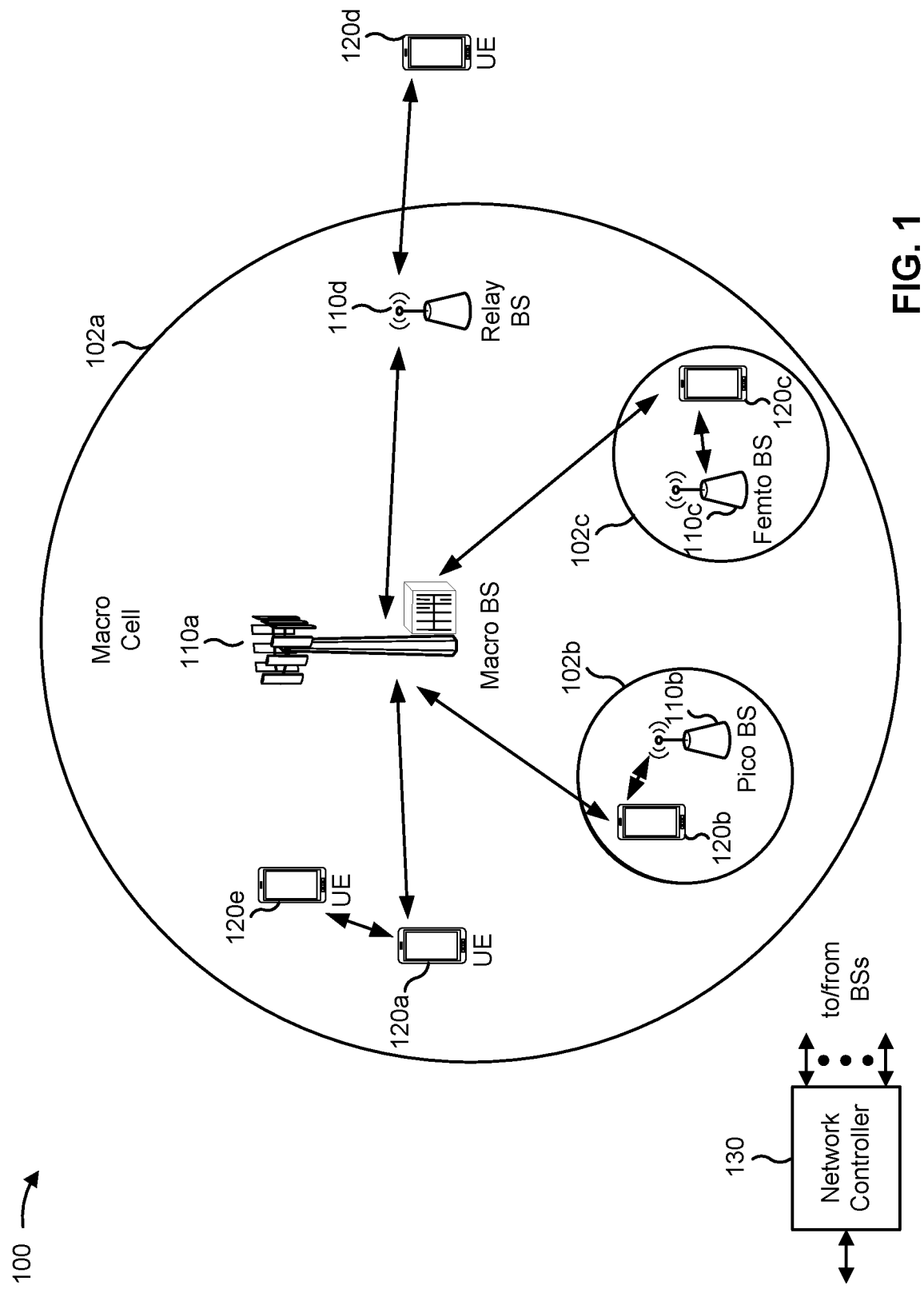
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of B Ss 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples are possible and may differ from what was described with regard to FIG. 1.

Figure 2:
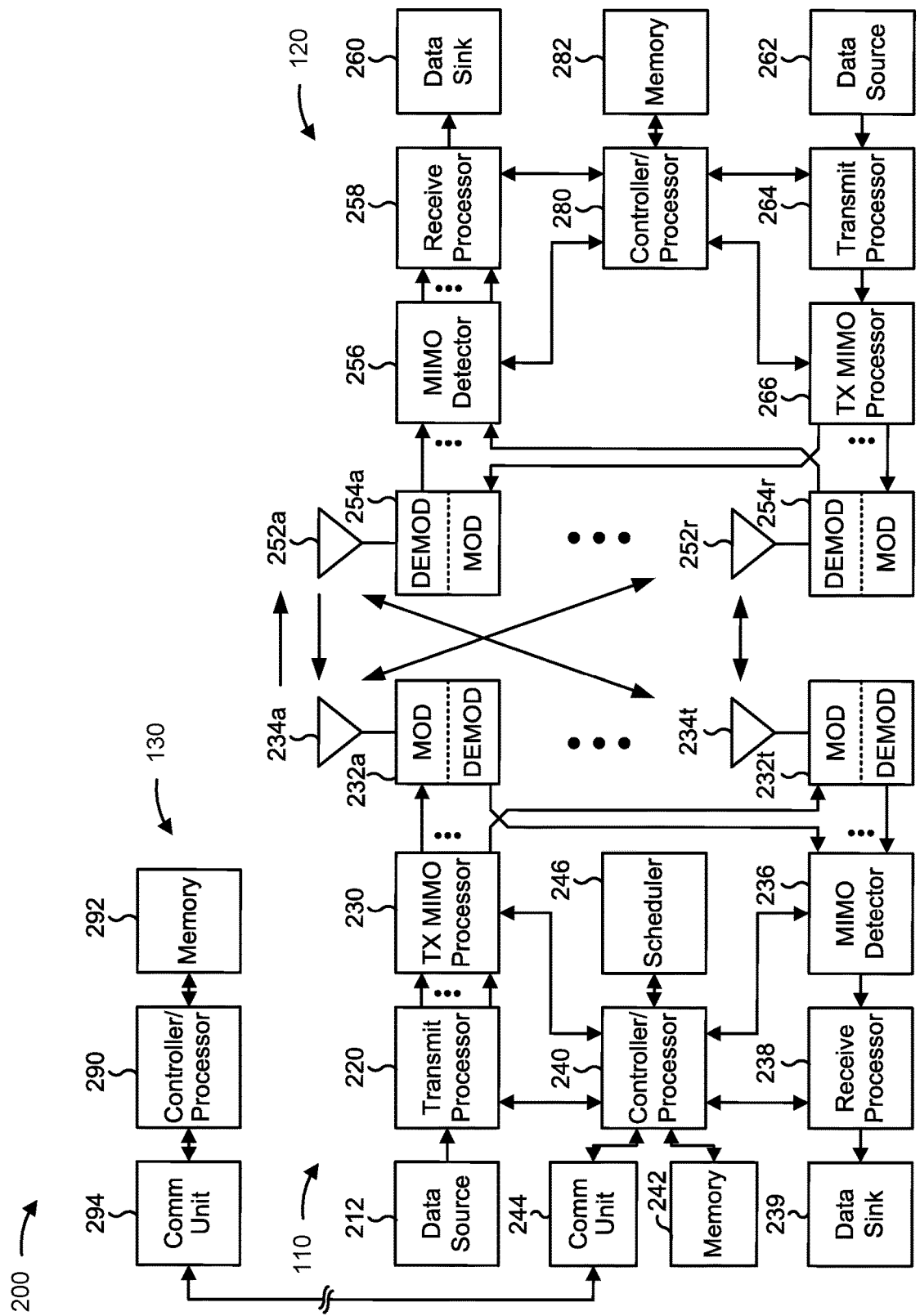
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with sounding reference signal configurations to support uplink transmissions with cyclic delay diversity, as described in more detail elsewhere herein. For example, controller/processor 240 of base station 110, controller/processor 280 of UE 120, and/or any other component(s) of FIG. 2 may perform or direct operations of, for example, process 900 of FIG. 9, process 1000 of FIG. 10, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for receiving an indication of a sounding reference signal (SRS) resource set to be used to signal a virtual port used for a physical uplink shared channel (PUSCH) communication, wherein the virtual port is a combination of at least two non-coherent or partially-coherent antenna ports of the UE using precoding and cyclic delay diversity; means for transmitting an SRS for the at least two non-coherent or partially-coherent antenna ports using one or more resources of the SRS resource set; and/or the like. Additionally, or alternatively, UE 120 may include means for determining that the UE is configured to use a virtual port for a physical uplink shared channel (PUSCH) communication, wherein the virtual port is a combination of at least two non-coherent or partially-coherent antenna ports of the UE using precoding and cyclic delay diversity; means for determining that the UE is configured with a first sounding reference signal (SRS) resource set that overlaps in time with a second SRS resource set, wherein the first SRS resource set and the second SRS resource set are associated with different uses; means for transmitting an SRS for the at least two non-coherent or partially-coherent antenna ports using one or more resources of the second SRS resource set or a third SRS resource set configured for the UE; and/or the like. In some aspects, such means may include one or more components of UE 120 described in connection with FIG. 2.

As indicated above, FIG. 2 is provided as an example. Other examples are possible and may differ from what was described with regard to FIG. 2.

Figure 3:
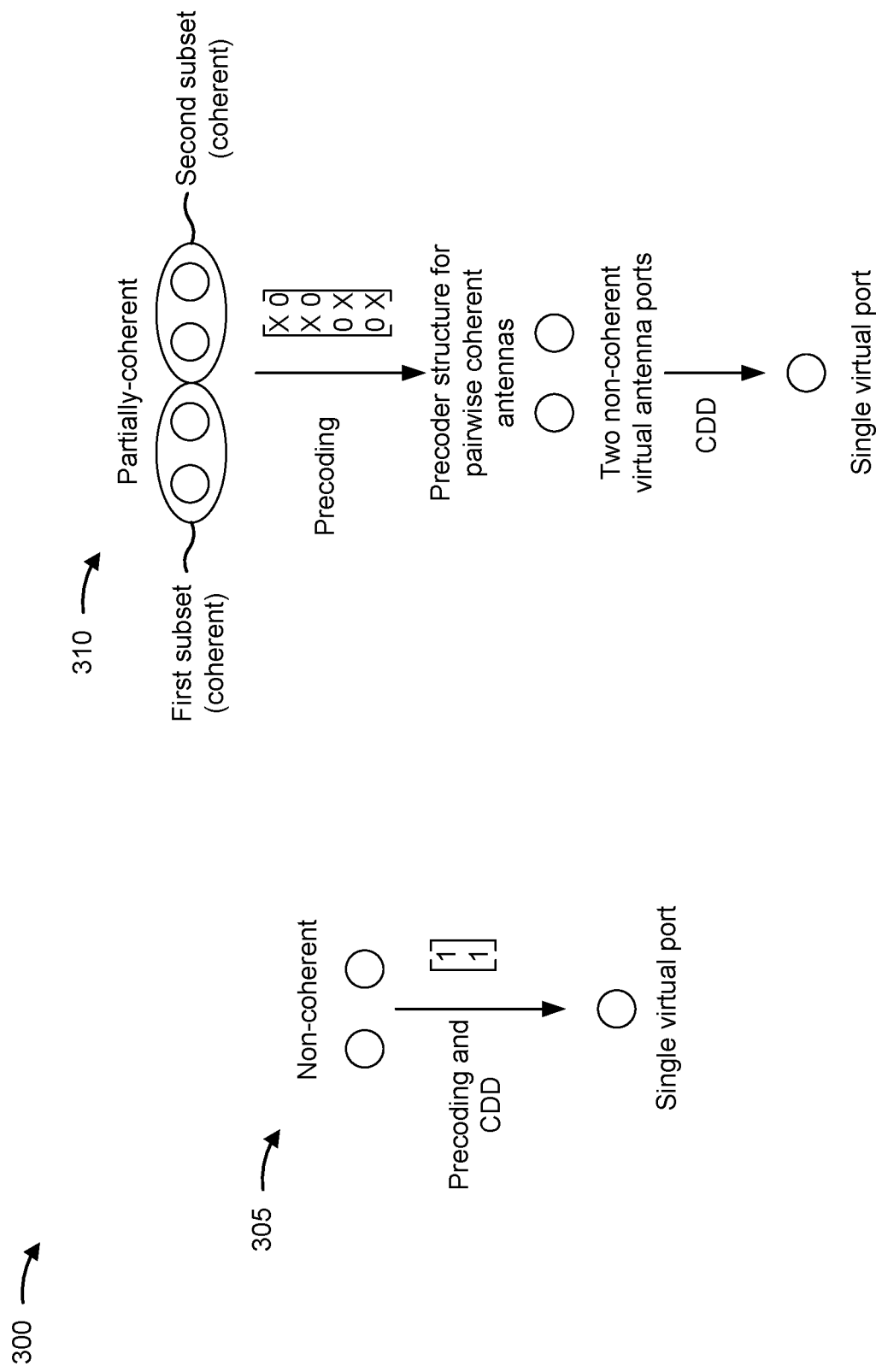
FIG. 3 is a diagram illustrating an example of forming a virtual port by combining non-coherent and/or partially-coherent antenna ports, in accordance with various aspects of the present disclosure.

FIG. 3 is a diagram illustrating an example 300 of forming a virtual port by combining non-coherent and/or partially-coherent antenna ports, in accordance with various aspects of the present disclosure.

A multi-antenna UE 120 may be classified into one of three groups depending on coherence of the antenna ports of the UE 120. A set of antenna ports (e.g., two antenna ports) are coherent if the relative phase among the set of antenna ports (e.g., between the two antenna ports) remains the same between the time of an SRS transmission from those antenna ports and a subsequent physical uplink shared channel (PUSCH) transmission from those antenna ports. When this is the case, the SRS can be used (e.g., by the UE 120 and/or a base station 110) to determine an uplink precoder for precoding the PUSCH transmission since the relative phase of the antenna ports will be the same for the SRS transmission and the PUSCH transmission. In this case, precoding can span across the set of coherent antenna ports (sometimes referred to herein as coherent ports). If a set of antenna ports is not coherent (i.e., non-coherent), then such uplink precoder determination becomes difficult because the relative phase of the antenna ports will change from the SRS transmission to the PUSCH transmission.

For example, a set of antenna ports is considered non-coherent if the relative phase among the set of antenna ports is different for the SRS transmission and the PUSCH transmission. In this case, precoding does not span across the set of non-coherent antenna ports (sometimes referred to as non-coherent ports). Furthermore, a set of antenna ports is considered partially-coherent if a first subset of the set of antenna ports is coherent with one another and a second subset of the set of antenna ports is coherent with one another, but the first subset of antenna ports and the second subset of antenna ports are not coherent with one another. In this case, common precoding may be used within the subsets of coherent ports, but not across the subsets of non-coherent ports. However, certain techniques can be applied to synthesize a virtual antenna port (sometimes referred to herein as a virtual port) from antenna ports that lack coherence (e.g., so that common precoding can be used on the virtual port and applied to the non-coherent antenna ports).

For example, as shown by reference number 305, a set of non-coherent antenna ports (e.g., shown as two non-coherent antenna ports) can be combined into a single virtual port using precoding (e.g., uplink precoding) and cyclic delay diversity. The precoder may be determined by the UE 120 and/or signaled by a base station 110. Cyclic delay diversity (CDD) may refer to a technique where a delay (e.g., a cyclic delay) is introduced on one of the non-coherent ports and not the other non-coherent port. The delay may be measured in samples (e.g., 5 samples, 10 samples, and/or the like), fractions of samples, and/or the like. For example, a first non-coherent port may transmit a first stream of samples, and the second non-coherent port may transmit a second stream of samples (e.g., which may be the same stream) with a slight cyclic delay (e.g., a delay of 5 samples, 10 samples, and/or the like). For example, for a cyclic delay of 5 samples where 16 samples are transmitted per symbol, the first non-coherent port may transmit the 16 samples with a first sample transmitted first (e.g., [s1, s2, s3, s4, . . . , s16]), and the second non-coherent port may transmit the 16 samples with the first sample transmitted sixth (e.g., with a delay of five samples) (e.g., [s12, s13, s14, s15, s16, s1, s2, s3, . . . , s11]).

Additionally, or alternatively, as shown by reference number 310, a set of partially-coherent antenna ports (sometimes referred to herein as partially-coherent ports) can be combined into a single virtual port using precoding (e.g., uplink precoding) and cyclic delay diversity, in a similar manner as described above. As shown, a first subset of ports may be coherent with one another, and a second subset of ports may be coherent with one another, but the two subsets may not be coherent with one another. As further shown, precoding may be applied to the individual subsets to generate a first virtual port and a second virtual port that are not coherent with one another. Then, CDD may be applied to these two virtual ports (e.g., by transmitting communications from the virtual ports using CDD), thereby forming a single virtual port from the partially-coherent ports (e.g., using precoding and CDD).

When a virtual port is formed from a set of non-coherent ports and/or a set of partially-coherent ports as described above (e.g., using precoding and CDD), such a virtual port may be used only for uplink communications (e.g., PUSCH communications), and may not be used for downlink communications, in some aspects. For example, the actual ports (e.g., the non-coherent ports and/or the partially-coherent ports), that are combined to form the virtual port, may be used for downlink communications. In this case, a base station 110 may need to determine channels that map to the actual ports (e.g., to select a precoder for downlink communications, to indicate such precoder(s) to the UE 120, and/or the like). Such channels are typically determined based at least in part on SRS transmitted from the UE 120 to the base station 110. However, the base station 110 may not have information regarding the virtual port and/or the actual ports that are combined to form the virtual port, and thus may not have information regarding the channels that map to these ports.

As described in more detail below, some techniques and apparatuses described herein permit a UE 120 to transmit SRS for a virtual port (e.g., a combination of at least two non-coherent or partially-coherent antenna ports of the UE 120 that uses precoding and CDD) using SRS, such that the base station 110 can determine channels that map to the virtual port and/or the actual ports combined to form the virtual port.

Although FIG. 3 shows pairs of antenna ports in sets and subsets, in some aspects, a different number of antenna ports may be included in a set or a subset. For example, a set of antenna ports or subset of antenna ports may include three antenna ports, four antenna ports, and/or the like.

As indicated above, FIG. 3 is provided as an example. Other examples are possible and may differ from what was described with regard to FIG. 3.

Figure 4:
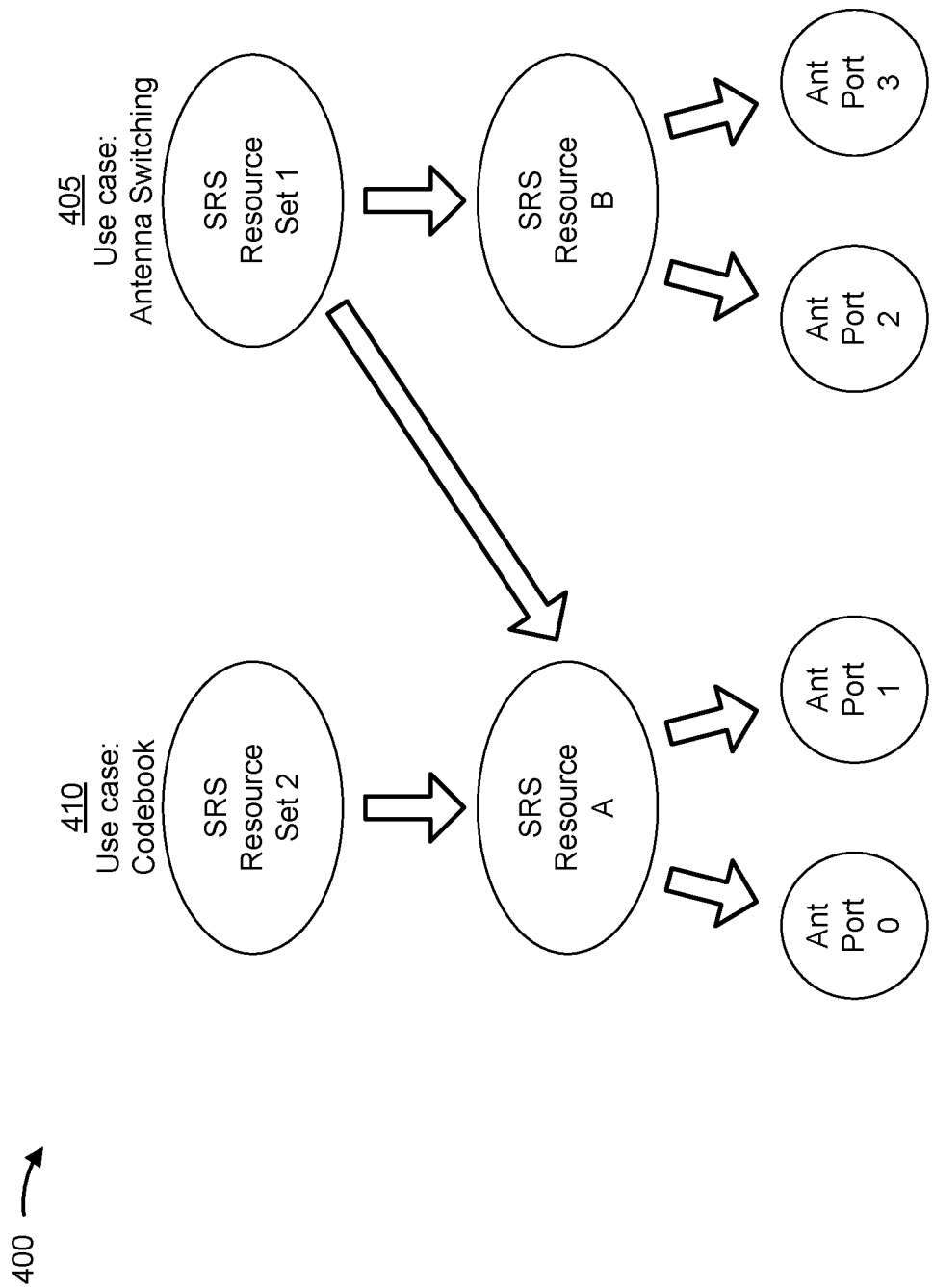
FIGS. 4-5 are diagrams illustrating examples of sounding reference signal resource sets, in accordance with various aspects of the present disclosure.

FIG. 4 is a diagram illustrating an example 400 of sounding reference signal (SRS) resource sets, in accordance with various aspects of the present disclosure.

A base station 110 may configure a UE 120 with one or more SRS resource sets to allocate resources for SRS transmissions by the UE 120. For example, a configuration for SRS resource sets may be indicated in a radio resource control (RRC) message (e.g., an RRC configuration message, and RRC reconfiguration message, and/or the like). As shown in FIG. 4, an SRS resource set may include one or more resources (e.g., shown as SRS Resource A and SRS Resource B), which may include time resources and/or frequency resources (e.g., a slot, a symbol, a resource block, a periodicity for the time resources, and/or the like).

As further shown in FIG. 4, an SRS resource may include one or more antenna ports on which an SRS is to be transmitted (e.g., in a time-frequency resource). Thus, a configuration for an SRS resource set may indicate one or more time-frequency resources in which an SRS is to be transmitted, and may indicate one or more antenna ports on which the SRS is to be transmitted in those time-frequency resources. In some aspects, the configuration for an SRS resource set may indicate a use case (e.g., in an SRS-SetUse information element) for the SRS resource set. For example, an SRS resource set may have a use case of antenna switching, codebook, non-codebook, beam management, and/or the like.

An antenna switching SRS resource set may be used to indicate downlink channel state information (CSI) with reciprocity between an uplink and downlink channel. For example, when there is reciprocity between an uplink channel and a downlink channel, a base station 110 may use an antenna switching SRS (e.g., an SRS transmitted using a resource of an antenna switching SRS resource set) to acquire downlink CSI (e.g., to determine a downlink precoder to be used to communicate with the UE 120).

A codebook SRS resource set may be used to indicate uplink CSI when a base station 110 indicates an uplink precoder to the UE 120. For example, when the base station 110 is configured to indicate an uplink precoder to the UE 120 (e.g., using a precoder codebook), the base station 110 may use a codebook SRS (e.g., an SRS transmitted using a resource of a codebook SRS resource set) to acquire uplink CSI (e.g., to determine an uplink precoder to be indicated to the UE 120 and used by the UE 120 to communicate with the base station 110).

A non-codebook SRS resource set may be used to indicate uplink CSI when the UE 120 selects an uplink precoder (e.g., instead of the base station 110 indicated an uplink precoder to be used by the UE 120. For example, when the UE 120 is configured to select an uplink precoder, the base station 110 may use a non-codebook SRS (e.g., an SRS transmitted using a resource of a non-codebook SRS resource set) to acquire uplink CSI. In this case, the non-codebook SRS may be precoded using a precoder selected by the UE 120 (e.g., which may be indicated to the base station 110).

A beam management SRS resource set may be used for indicating CSI for millimeter wave communications.

As shown in FIG. 4, in some aspects, different SRS resource sets indicated to the UE 120 (e.g., having different use cases) may overlap (e.g., in time, in frequency, and/or the like, such as in the same slot). For example, as shown by reference number 405, a first SRS resource set (e.g., shown as SRS Resource Set 1) is shown as having an antenna switching use case. As shown, this example antenna switching SRS resource set includes a first SRS resource (shown as SRS Resource A) and a second SRS resource (shown as SRS Resource B). Thus, antenna switching SRS may be transmitted in SRS Resource A (e.g., a first time-frequency resource) using antenna port 0 and antenna port 1, and may be transmitted in SRS Resource B (e.g., a second time-frequency resource) using antenna port 2 and antenna port 3.

As shown by reference number 410, a second SRS resource set (e.g., shown as SRS Resource Set 2) may be a codebook use case. As shown, this example codebook SRS resource set includes only the first SRS resource (shown as SRS Resource A). Thus, codebook SRS may be transmitted in SRS Resource A (e.g., the first time-frequency resource) using antenna port 0 and antenna port 1. In this case, the UE 120 may not transmit codebook SRS in SRS Resource B (e.g., the second time-frequency resource) using antenna port 2 and antenna port 3. Additional details regarding the example SRS resource set configuration of FIG. 4 are described below in connection with FIG. 5.

As indicated above, FIG. 4 is provided as an example. Other examples are possible and may differ from what was described with regard to FIG. 4.

Figure 5:
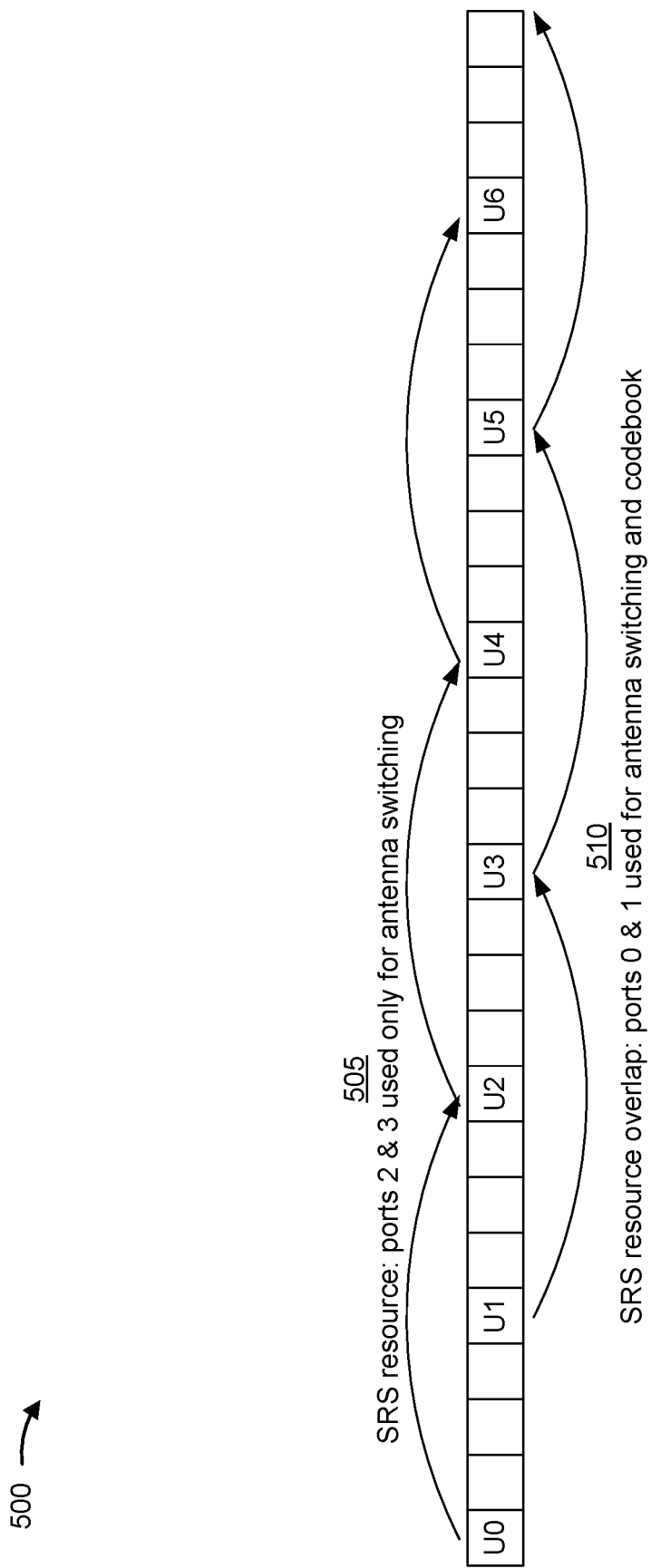

FIG. 5 is a diagram illustrating another example 500 of SRS resource sets, in accordance with various aspects of the present disclosure.

FIG. 5 shows an example configuration of slots (e.g., time resources) in which SRS may be transmitted using the SRS resource set configuration described above in connection with FIG. 4. In some aspects, this configuration may be used, for example, for a UE 120 with 2 transmit chains and 4 receive chains, where all antenna ports of the UE 120 are non-coherent. In some aspects, the example configuration of FIG. 5 may require two downlink ports to be reused for uplink transmissions.

In the example configuration of FIG. 5, an antenna switching SRS resource set may include two periodic SRS resources having two ports each, and one of the SRS resources may be sounded per uplink slot (e.g., labeled U0, U1, U2, and so on). For example, and as shown by reference number 505, one SRS resource (e.g., SRS Resource B of FIG. 4) may include antenna ports 2 and 3. In this case, the UE 120 may transmit antenna switching SRS on antenna ports 2 and 3 in every other uplink slot (e.g., with a periodicity of every 8 slots, including U0, U2, U4, U6, and so on). As shown by reference number 510, another SRS resource (e.g., SRS Resource A of FIG. 4) may include antenna ports 0 and 1. In this case, the UE 120 may transmit antenna switching SRS on antenna ports 0 and 1 in every other uplink slot, starting with a different uplink slot than SRS Resource B (e.g., with a periodicity of every 8 slots, including U1, U3, U5, and so on).

Furthermore, in this configuration, a codebook SRS resource set may include one periodic SRS resource having two ports, and this SRS resource may be sounded in every other uplink slot (e.g., labeled U1, U3, U5, and so on). For example, and as shown by reference number 510, this SRS resource (e.g., SRS Resource A of FIG. 4) may include antenna ports 0 and 1. In this case, the UE 120 may transmit codebook SRS on antenna ports 0 and 1 in every other uplink slot (e.g., with a periodicity of every 8 slots, including U1, U3, U5, and so on). Thus, the codebook SRS resource (e.g., SRS Resource A) may overlap with the antenna switching SRS resource (e.g., also SRS Resource A), as indicated above in connection with FIG. 4. Such overlap in SRS resources may mean that SRS for two different use cases are transmitted on the same ports in the same time-frequency resources.

When a UE 120 is configured with overlapping SRS resource sets for different use cases, a base station 110 may be able to properly interpret received SRS (e.g., for determining a channel, for acquiring CSI, for mapping a port to a channel, for determining an uplink precoder, for determining a downlink precoder, and/or the like) when the base station 110 configures the UE 120 with those SRS resource sets, so that the base station 110 has information regarding the received SRS. However, when the UE 120 combines non-coherent and/or partially-coherent antenna ports (both of which are described above in connection with FIG. 3) of the UE 120 using precoding and cyclic delay diversity to form a virtual port (e.g., as described above in connection with FIG. 3) and transmits SRS for the virtual port and/or the combined ports, then the base station 110 may not be able to properly interpret the received SRS (e.g., because the base station 110 does not have information regarding the virtual ports, the ports combined to form the virtual ports, and/or the like). For example, the base station 110 may interpret the received SRS as being for actual ports and/or with an assumption that the SRS correspond to a port and/or a channel that will later be used to transmit a PUSCH communication. However, since the PUSCH communication may be transmitted by a virtual port with different characteristics than the combined ports (e.g., due to precoding and application of CDD), the assumption by the base station 110 may be incorrect.

Some techniques and apparatuses described herein permit a base station 110 to acquire information regarding virtual ports and/or combined ports, which may be used to properly interpret a received SRS. This may improve channel determination, may improve accuracy of determined CSI, may assist with mapping a port to a channel, may assist with precoder determination, may assist with selecting an appropriate modulation and coding scheme (MCS), and/or the like. As a result, network performance may be improved, errors may be reduced, and/or the like. Additional details are provided below.

As indicated above, FIG. 5 is provided as an example. Other examples are possible and may differ from what was described with regard to FIG. 5.

Figure 6:
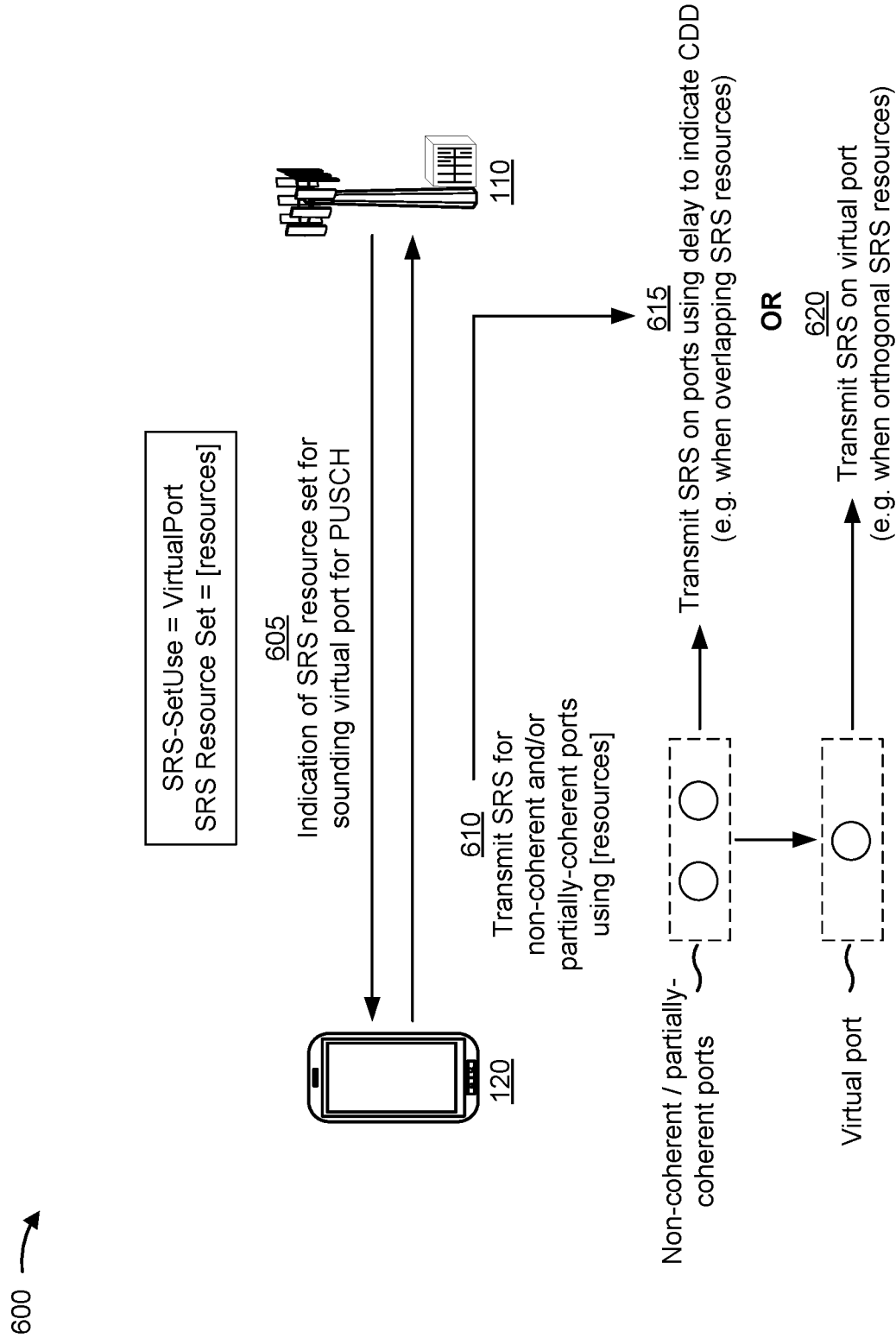
FIGS. 6-8 are diagrams illustrating examples of sounding reference signal configurations to support uplink transmissions with cyclic delay diversity, in accordance with various aspects of the present disclosure.

FIG. 6 is a diagram illustrating an example 600 of SRS configurations to support uplink transmissions with cyclic delay diversity, in accordance with various aspects of the present disclosure.

As shown by reference number 605, a UE 120 may receive, from a base station 110, an indication of an SRS resource set to be used to signal a virtual port used for a PUSCH communication. As described elsewhere herein, the virtual port may be a combination of at least two non-coherent or partially-coherent antenna ports of the UE 120 using precoding and cyclic delay diversity. In some aspects, the indicated SRS resource set may be associated with a use case other than antenna switching, codebook, non-codebook, and beam management. For example, the SRS resource set may be associated with a virtual port use case, which may be indicated by an SRS-SetUse information element (e.g., shown as VirtualPort). The base station may indicate the use case and the resources to be used to transmit SRS for that use case (e.g., shown as [resources]). In some aspects, the SRS resource set configuration (e.g., the use case, the resources, and/or the like) may be signaled to the UE 120 using an RRC message and/or the like.

As shown by reference number 610, the UE 120 may transmit an SRS (e.g., one or more SRS) for the at least two non-coherent or partially-coherent antenna ports using one or more resources of the SRS resource set. In some aspects, such transmission may include transmitting SRS on the actual antenna ports using a delay that indicates that the actual ports will be combined using CDD. Alternatively, such transmission may include transmitting SRS on the virtual port.

As shown by reference number 615, in some aspects, the UE 120 may transmit SRS on the actual antenna ports using a delay that indicates that the actual ports will be combined using CDD. For example, the UE 120 may transmit SRS on a first antenna port, of the at least two non-coherent or partially-coherent antenna ports, and may transmit SRS on a second antenna port, of the at least two non-coherent or partially-coherent antenna ports, with a delay that indicates use of CDD for the at least two non-coherent or partially-coherent antenna ports. The delay used by the UE 120 for such transmission may indicate, to the base station 110, a manner in which a PUSCH communication is to be interpreted (e.g., a manner in which CDD is to be applied by the UE 120 on the actual ports for a PUSCH communication).

In some aspects, the UE 120 may indicate an actual delay to be used by the UE 120 for CDD for a subsequent PUSCH communication. For example, the delay used to transmit the SRS may be the same as the delay that will be used for the PUSCH communication. In some aspects, the delay may be a function of a number of resource blocks and/or a bandwidth assigned to the UE 120 (e.g., by the base station 110) for the PUSCH communication. In some aspects, rather than indicating the actual delay, the UE 120 may indicate a maximum delay permitted to be used by the UE 120 (e.g., based at least in part on a UE capability and/or configuration) for CDD for the subsequent PUSCH communication. In some aspects, the maximum delay and the actual delay may be the same. In either case, the base station 110 may use the indicated delay to more accurately interpret the subsequent PUSCH communication transmitted by the UE 120 using the virtual port.

In some aspects, the SRS resource set to be used to signal the virtual port may overlap with (e.g., may partially overlap with or fully overlap with) another SRS resource set having a different use case (e.g., another SRS resource set indicated to the UE 120 by the base station 110). For example, the SRS resource set to be used to signal the virtual port may overlap with an antenna switching SRS resource set. In some aspects, the UE 120 may transmit SRS on the actual antenna ports using a delay that indicates that the actual ports will be combined using CDD when the SRS resource set to be used to signal the virtual port overlaps with the antenna switching SRS resource set. In this way, the actual antenna ports (e.g., that are combined to form the virtual port) may be used to transmit SRS for both the virtual port use case and the antenna switching use case when SRS resource sets for these use cases overlap. In this case, the base station 110 may use the received SRS to synthesize the virtual port from the actual ports to determine CSI of a channel that would be used by the UE 120 to transmit the PUSCH communication on the virtual port. As used herein, an overlap may refer to an overlap in time, an overlap in frequency, and/or the like.

As shown by reference number 620, in some aspects, the UE 120 may transmit SRS on the virtual port (e.g., using precoding and cyclic delay diversity to combine the actual ports). In some aspects, the SRS resource set to be used to signal the virtual port may be orthogonal to (e.g., may not overlap with) another SRS resource set having a different use case (e.g., another SRS resource set indicated to the UE 120 by the base station 110). For example, the SRS resource set to be used to signal the virtual port may be orthogonal to an antenna switching SRS resource set. In some aspects, the UE 120 may transmit SRS on the virtual port when the SRS resource set to be used to signal the virtual port is orthogonal to the antenna switching SRS resource set. In this way, the base station 110 need not synthesize the virtual port. Alternatively, the UE 120 may transmit SRS on the actual antenna ports, as described above, and the base station 110 may synthesize the virtual port. Thus, sounding the virtual port may require that the SRS resource sets do not overlap, whereas sounding the actual ports may be done regardless of whether the SRS resource sets overlap.

In some aspects, and as described in more detail below in connection with FIG. 7, the SRS resource set to be used to signal the virtual port may have a longer periodicity (e.g., a lower duty cycle) than the antenna switching SRS resource set. Additionally, or alternatively, as also described in more detail below in connection with FIG. 7, the SRS resource set to be used to signal the virtual port may be activated and deactivated, and in some aspects may be activated for a same duration as the PUSCH communication.

By transmitting SRS for a virtual port to be used to transmit a PUSCH communication and/or by transmitting SRS for the actual ports to be combined to form the virtual port and indicating a manner in which the actual ports are to be combined (e.g., a delay for CDD), a base station 110 may be able to more accurately determine a channel for the virtual port, thereby improving CSI determination for a channel (e.g., the PUSCH) used to transmit the PUSCH communication. Additionally, or alternatively, the base station 110 may determine the delay used for CDD, which may assist with determining the power delay profile of the channel used to transmit the PUSCH communication, may assist with channel estimation when decoding the PUSCH communication (e.g., using demodulation reference signal (DMRS)-based channel estimation), and/or the like.

As indicated above, FIG. 6 is provided as an example. Other examples are possible and may differ from what was described with regard to FIG. 6.

Figure 7:
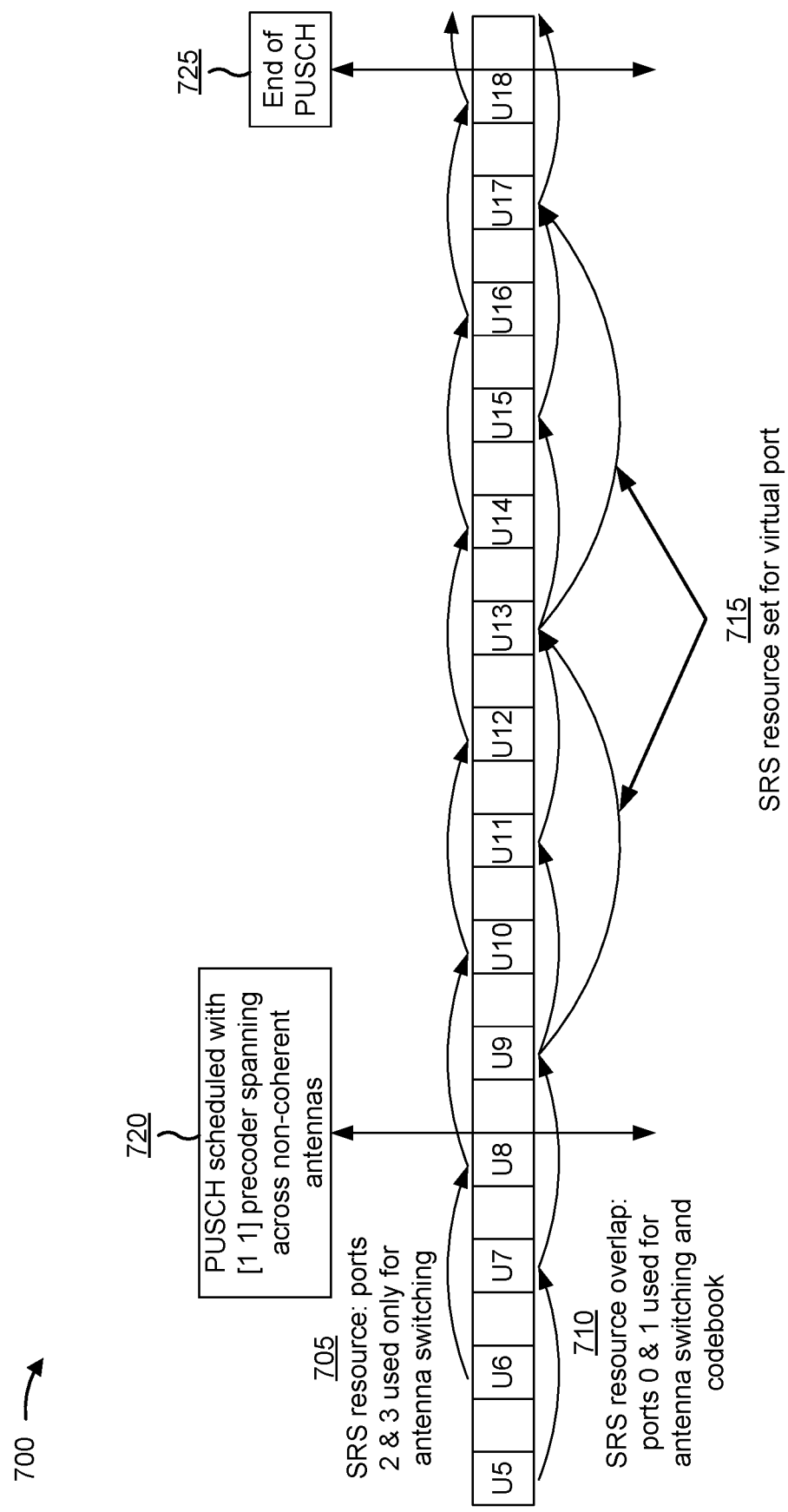

FIG. 7 is a diagram illustrating another example 700 of SRS configurations to support uplink transmissions with cyclic delay diversity, in accordance with various aspects of the present disclosure.

FIG. 7 shows an example configuration of slots (e.g., time resources) similar to the configuration shown in FIG. 5, except with an additional SRS resource set to be used for sounding a virtual port. In a similar manner as described above in connection with FIG. 5, an antenna switching SRS resource set may include two periodic SRS resources having two ports each, and one of the SRS resources may be sounded per uplink slot. For example, as shown by reference number 705, one SRS resource (e.g., SRS Resource B of FIG. 4) may include antenna ports 2 and 3, and the UE 120 may transmit antenna switching SRS on antenna ports 2 and 3 in even uplink slots. As shown by reference number 710, another SRS resource (e.g., SRS Resource A of FIG. 4) may include antenna ports 0 and 1, and the UE 120 may transmit antenna switching SRS on antenna ports 0 and 1 in odd uplink slots.

As also described above in connection with FIG. 5, in this configuration, a codebook SRS resource set may include one periodic SRS resource having two ports, and this SRS resource may be sounded in odd uplink slots. For example, as shown by reference number 710, this SRS resource (e.g., SRS Resource A of FIG. 4) may include antenna ports 0 and 1, and the UE 120 may transmit codebook SRS on antenna ports 0 and 1 in odd uplink slots. Thus, the codebook SRS resource (e.g., SRS Resource A) may overlap with an antenna switching SRS resource (e.g., also SRS Resource A).

As shown by reference number 715, a virtual port SRS resource set may include a periodic SRS resource having two ports, and this SRS resource may be sounded in odd uplink slots (e.g., in the slots that overlap with the antenna switching SRS resources and/or the codebook SRS resources). In this case, the UE 120 may transmit virtual port SRS in odd uplink slots. Since the virtual port SRS resource set overlaps with the antenna switching SRS resource set (and the codebook SRS resource set), the UE 120 may transmit SRS for the virtual port by transmitting SRS on a first actual antenna port and a second actual antenna port with a delay that indicates use of CDD, as described above in connection with FIG. 6. If the virtual port SRS resource set does not overlap in time with the antenna switching SRS resource set, then the UE 120 may transmit SRS for the virtual port by transmitting the SRS on the virtual port instead of the actual ports, as described above in connection with FIG. 6.

As shown in FIG. 7, in some aspects, the virtual port SRS resource set may have a longer periodicity than the antenna switching SRS resource set. Additionally, or alternatively, the virtual port SRS resource set may have a longer periodicity than the antenna switching SRS resource set with which the virtual port SRS resource set overlaps. For example, the antenna switching SRS resource set is shown as having a periodicity of 2 slots (e.g., every uplink opportunity), and the antenna switching SRS resource set that overlaps with the virtual port SRS resource set is shown as having a periodicity of 4 slots (e.g., every other uplink opportunity), while the virtual port SRS resource set is shown as having a periodicity of 8 slots (e.g., every 4 uplink opportunities).

As further shown in FIG. 7, in some aspects, the virtual port SRS resource set may be activated for a same duration as the PUSCH communication. As shown by reference number 720, the PUSCH communication is shown as being scheduled starting in slot U8. As shown by reference number 725, the PUSCH communication is shown as ending in slot U18. As a result, the virtual SRS resource set is shown as only being activated between slots U8 (e.g., the PUSCH starting slot) and U18 (e.g., the PUSCH ending slot), and SRS is transmitted only in resources of the virtual port SRS resource set that fall between slots U8 and U18. Since the virtual port is only used for PUSCH communications in some cases, the UE 120 may be configured to only transmit SRS for the virtual port for the duration of a PUSCH communication, thereby conserving network resources.

As indicated above, FIG. 7 is provided as an example. Other examples are possible and may differ from what was described with regard to FIG. 7.

Figure 8:
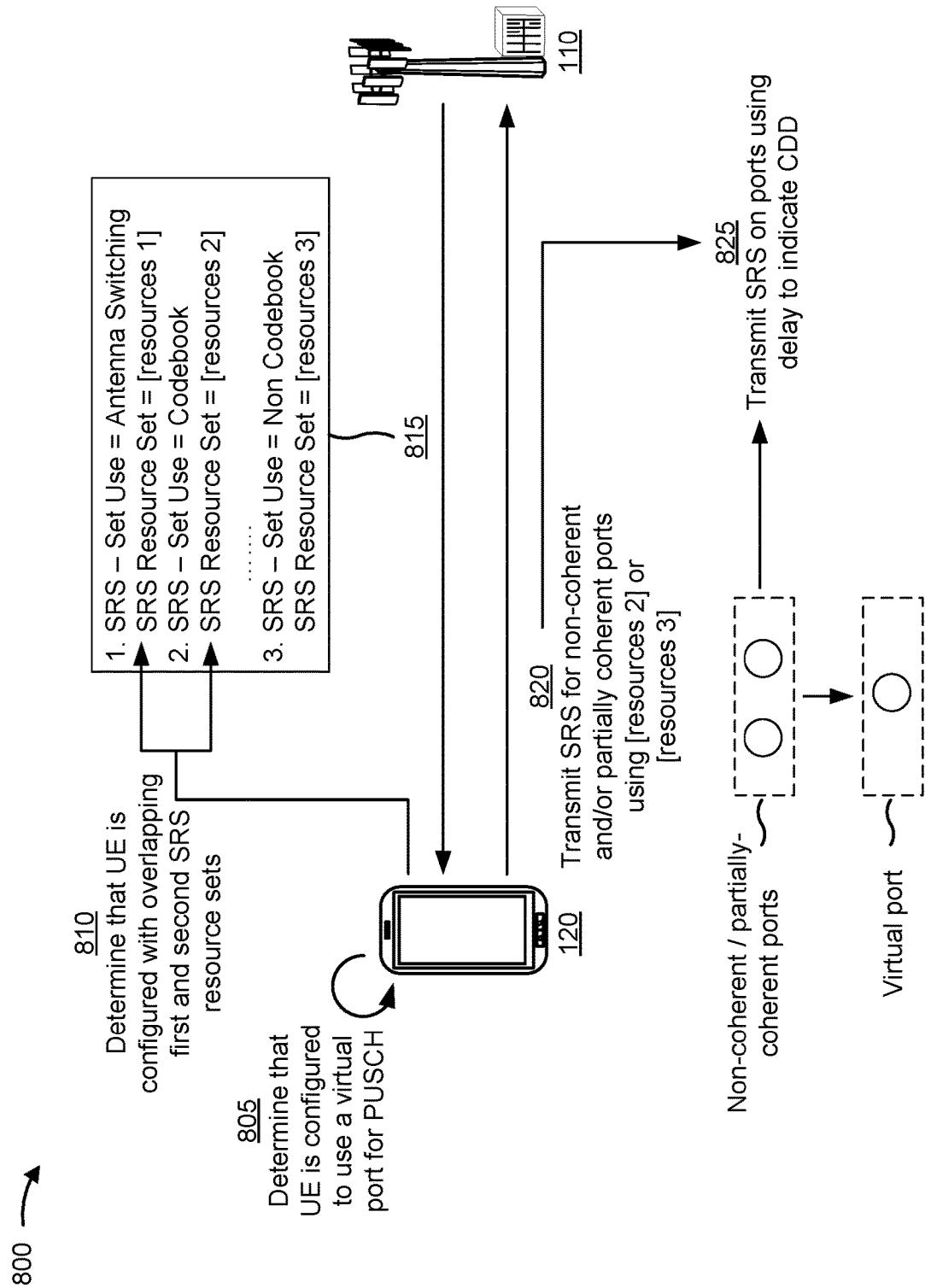

FIG. 8 is a diagram illustrating another example 800 of SRS configurations to support uplink transmissions with cyclic delay diversity, in accordance with various aspects of the present disclosure.

As shown by reference number 805, a UE 120 may determine that the UE 120 is configured to use a virtual port for a PUSCH communication. As described elsewhere herein, the virtual port may be a combination of at least two non-coherent or partially-coherent antenna ports of the UE 120 using precoding and cyclic delay diversity. In some aspects, the UE 120 may make this determination based at least in part on a configuration of the UE 120, a determination that the UE 120 has at least two non-coherent antenna ports, a determination that the UE 120 has at least two partially-coherent antenna ports, and/or the like.

As shown by reference number 810, the UE 120 may determine that the UE 120 is configured with a first SRS resource set that overlaps with a second SRS resource set. The first SRS resource set and the second SRS resource set may be associated with different uses. For example, the first SRS resource set may be an antenna switching SRS resource set, and the second SRS resource set may be a codebook SRS resource set. Additionally, or alternatively, the UE 120 may be configured with a third SRS resource set, such as a non-codebook SRS resource set. In some aspects, this SRS resource set configuration may be indicated to the UE 120 by a base station 110 (e.g., in an RRC message and/or the like), as shown by reference number 815.

As further shown, the first SRS resource set may include first SRS resources (shown as [resources 1]), the second SRS resource set may include second SRS resources (shown as [resources 2]), and the third SRS resource set may include third SRS resources (shown as [resources 3]). As indicated above, the first SRS resource set may partially or fully overlap with the second SRS resource set. Additionally, or alternatively, the first SRS resource set may partially or fully overlap with the third SRS resource set. Additionally, or alternatively, the second SRS resource set may partially or fully overlap with the third SRS resource set.

As shown by reference number 820, the UE 120 may transmit an SRS for the at least two non-coherent or partially-coherent antenna ports using one or more resources of the second SRS resource set and/or the third SRS resource set. As shown by reference number 825, such transmission may include transmitting SRS on the actual antenna ports using a delay that indicates that the actual ports will be combined using CDD, in a similar manner as described above in connection with FIG. 6. For example, the UE 120 may transmit SRS on a first antenna port, of the at least two non-coherent or partially-coherent antenna ports, and may transmit SRS on a second antenna port, of the at least two non-coherent or partially-coherent antenna ports, with a delay that indicates use of CDD for the at least two non-coherent or partially-coherent antenna ports. The delay used by the UE 120 for such transmission may indicate, to the base station 110, a manner in which a PUSCH communication is to be interpreted (e.g., a manner in which CDD is to be applied by the UE 120 on the actual ports for a PUSCH communication).

As described above in connection with FIG. 6, in some aspects, the UE 120 may indicate an actual delay to be used by the UE 120 for CDD for a subsequent PUSCH communication. For example, the delay used to transmit the SRS may be the same as the delay that will be used for the PUSCH communication. In some aspects, the delay may be a function of a number of resource blocks and/or a bandwidth assigned to the UE 120 (e.g., by the base station 110) for the PUSCH communication. In some aspects, rather than indicating the actual delay, the UE 120 may indicate a maximum delay permitted to be used by the UE 120 (e.g., based at least in part on a UE capability and/or configuration) for CDD for the subsequent PUSCH communication. In some aspects, the maximum delay and the actual delay may be the same. In either case, the base station 110 may use the indicated delay to more accurately interpret the subsequent PUSCH communication transmitted by the UE 120 using the virtual port.

In this case, where the UE 120 does not use a separate virtual port SRS resource set (e.g., for a virtual port use case), and instead re-uses a codebook SRS resource set and/or a non-codebook SRS resource set to sound the non-coherent and/or partially-coherent ports, the SRS resources used to signal the virtual port necessarily overlap with SRS resources of at least one of those SRS resource sets. In this case, the UE 120 may transmit SRS on the actual antenna ports using a delay that indicates that the actual ports will be combined using CDD. In this way, the base station 110 may use the received SRS to synthesize the virtual port from the actual ports to determine CSI of a channel that would be used by the UE 120 to transmit the PUSCH communication on the virtual port.

As indicated above, FIG. 8 is provided as an example. Other examples are possible and may differ from what was described with regard to FIG. 8.

Figure 9:
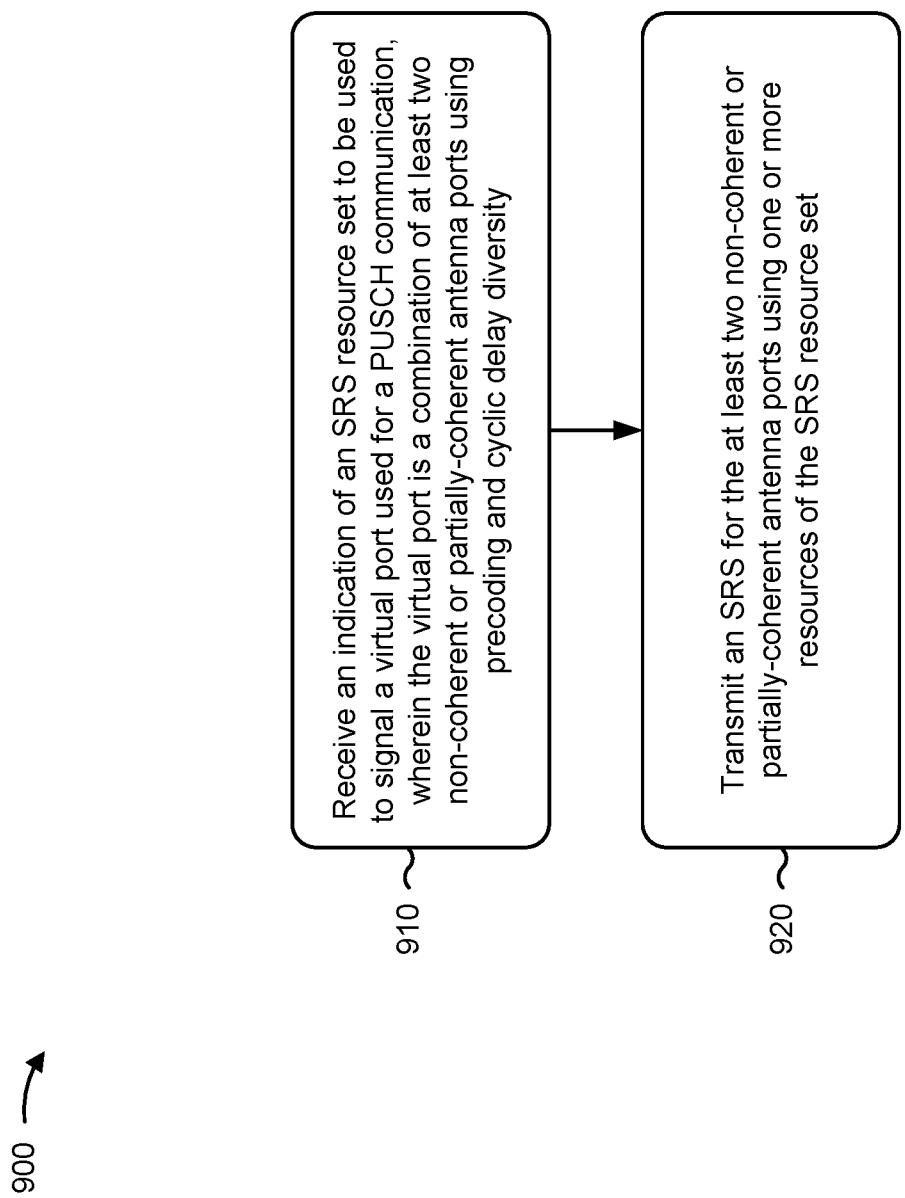
FIGS. 9-10 are diagrams illustrating example processes performed, for example, by a user equipment, in accordance with various aspects of the present disclosure.

FIG. 9 is a diagram illustrating an example process 900 performed, for example, by a UE, in accordance with various aspects of the present disclosure. Example process 900 is an example where a UE (e.g., UE 120 and/or the like) performs operations associated with SRS configurations to support uplink transmissions with cyclic delay diversity.

As shown in FIG. 9, in some aspects, process 900 may include receiving an indication of a sounding reference signal (SRS) resource set to be used to signal a virtual port used for a physical uplink shared channel (PUSCH) communication, wherein the virtual port is a combination of at least two non-coherent or partially-coherent antenna ports of the UE using precoding and cyclic delay diversity (block 910). For example, the UE (e.g., using antenna 252, DEMOD 254, MIMO detector 256, receive processor 258, controller/processor 280, and/or the like) may receive an indication of an SRS resource set to be used to signal a virtual port used for a PUSCH communication, as described above in connection with FIGS. 6-7. In some aspects, the virtual port is a combination of at least two non-coherent or partially-coherent antenna ports of the UE using precoding and cyclic delay diversity.

As further shown in FIG. 9, in some aspects, process 900 may include transmitting an SRS for the at least two non-coherent or partially-coherent antenna ports using one or more resources of the SRS resource set (block 920). For example, the UE (e.g., using controller/processor 280, transmit processor 264, TX MIMO processor 266, MOD 254, antenna 252, and/or the like) may transmit an SRS for the at least two non-coherent or partially-coherent antenna ports using one or more resources of the SRS resource set, as described above in connection with FIGS. 6-7.

Process 900 may include additional aspects, such as any single aspect or any combination of aspects described below and/or in connection with one or more other processes described elsewhere herein.

In a first aspect, the SRS resource set does not overlap in time with another indicated SRS resource set having a different use than the SRS resource set.

In a second aspect, alone or in combination with the first aspect, the SRS resource set does not overlap in time with an antenna switching SRS resource set used to indicate downlink channel state information with reciprocity between an uplink and downlink channel.

In a third aspect, alone or in combination with one or more of the first and second aspects, the SRS is transmitted on the virtual port using precoding and cyclic delay diversity.

In a fourth aspect, alone or in combination with one or more of the first through third aspects, the SRS resource set partially or fully overlaps in time with another indicated SRS resource set having a different use than the SRS resource set.

In a fifth aspect, alone or in combination with one or more of the first through fourth aspects, the SRS resource set partially or fully overlaps in time with an antenna switching SRS resource set used to indicate downlink channel state information with reciprocity between an uplink and downlink channel.

In a sixth aspect, alone or in combination with one or more of the first through fifth aspects, the SRS is transmitted on a first antenna port, of the at least two non-coherent or partially-coherent antenna ports, and is transmitted on a second antenna port, of the at least two non-coherent or partially-coherent antenna ports, with a delay that indicates use of cyclic delay diversity for the at least two non-coherent or partially-coherent antenna ports.

In a seventh aspect, alone or in combination with one or more of the first through sixth aspects, the delay indicates a maximum delay permitted to be used by the UE for transmitting the PUSCH communication on the virtual port with cyclic delay diversity.

In an eighth aspect, alone or in combination with one or more of the first through seventh aspects, the delay indicates an actual delay to be used by the UE for transmitting the PUSCH communication on the virtual port with cyclic delay diversity.

In a ninth aspect, alone or in combination with one or more of the first through eighth aspects, the delay used to transmit the SRS is a function of a number of resource blocks assigned to the UE for the PUSCH communication.

In a tenth aspect, alone or in combination with one or more of the first through ninth aspects, the SRS resource set has a longer periodicity than an antenna switching SRS resource set used to indicate downlink channel state information with reciprocity between an uplink and downlink channel.

In an eleventh aspect, alone or in combination with one or more of the first through tenth aspects, the SRS resource set is activated for a same duration as the PUSCH communication.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
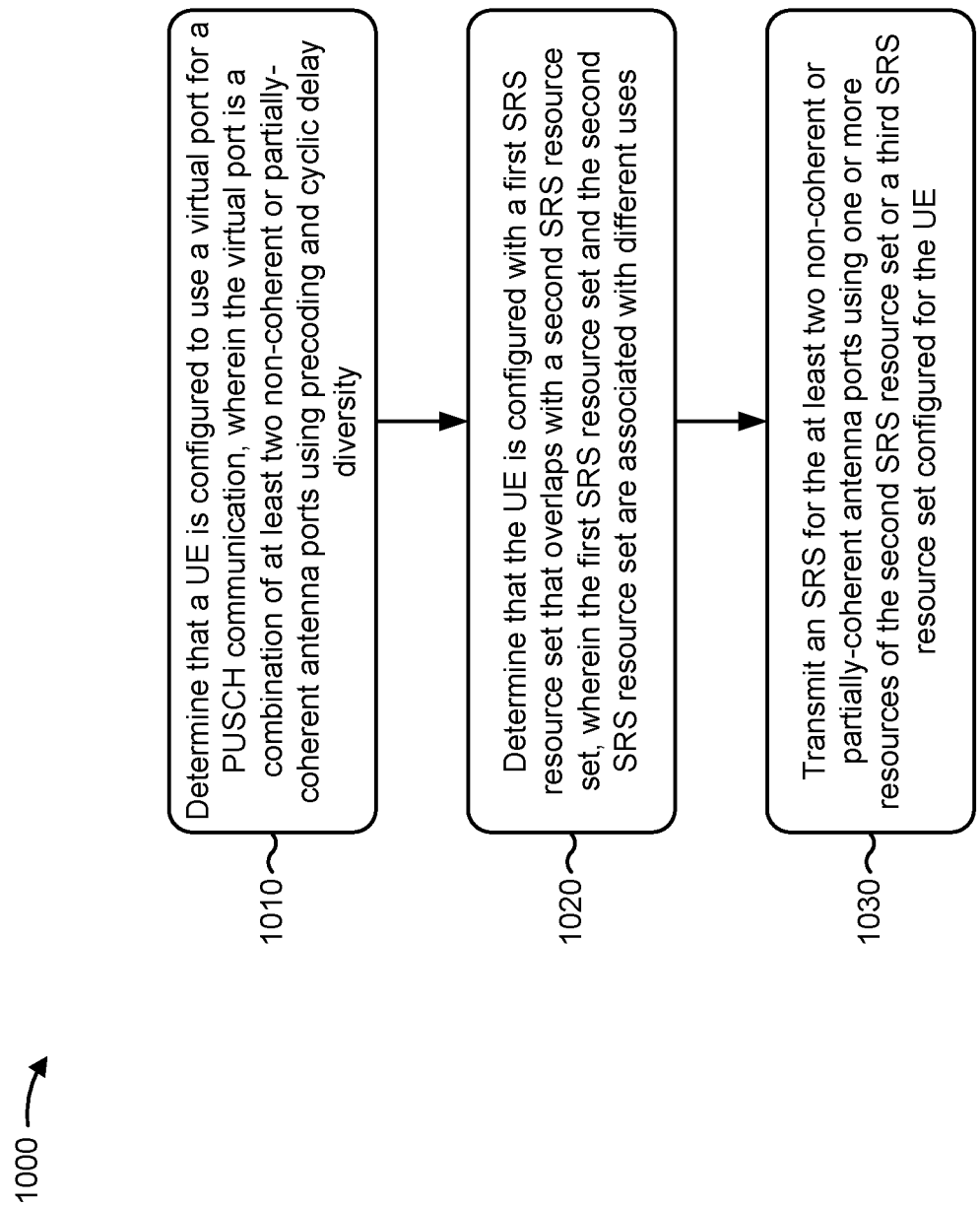

FIG. 10 is a diagram illustrating an example process 1000 performed, for example, by a UE, in accordance with various aspects of the present disclosure. Example process 1000 is an example where a UE (e.g., UE 120 and/or the like) performs operations associated with SRS configurations to support uplink transmissions with cyclic delay diversity.

As shown in FIG. 10, in some aspects, process 1000 may include determining that the UE is configured to use a virtual port for a physical uplink shared channel (PUSCH) communication, wherein the virtual port is a combination of at least two non-coherent or partially-coherent antenna ports of the UE using precoding and cyclic delay diversity (block 1010). For example, the UE (e.g., using controller/processor 280 and/or the like) may determine that the UE is configured to use a virtual port for a PUSCH communication, as described above in connection with FIG. 8. In some aspects, the virtual port is a combination of at least two non-coherent or partially-coherent antenna ports of the UE using precoding and cyclic delay diversity.

As further shown in FIG. 10, in some aspects, process 1000 may include determining that the UE is configured with a first sounding reference signal (SRS) resource set that overlaps in time with a second SRS resource set, wherein the first SRS resource set and the second SRS resource set are associated with different uses (block 1020). For example, the UE (e.g., using controller/processor 280 and/or the like) may determine that the UE is configured with a first SRS resource set that overlaps in time with a second SRS resource set, as described above in connection with FIG. 8. In some aspects, the first SRS resource set and the second SRS resource set are associated with different uses.

As further shown in FIG. 10, in some aspects, process 1000 may include transmitting an SRS for the at least two non-coherent or partially-coherent antenna ports using one or more resources of the second SRS resource set or a third SRS resource set configured for the UE (block 1030). For example, the UE (e.g., using controller/processor 280, transmit processor 264, TX MIMO processor 266, MOD 254, antenna 252, and/or the like) may transmit an SRS for the at least two non-coherent or partially-coherent antenna ports using one or more resources of the second SRS resource set or a third SRS resource set configured for the UE, as described above in connection with FIG. 8.

Process 1000 may include additional aspects, such as any single aspect or any combination of aspects described below and/or in connection with one or more other processes described elsewhere herein.

In a first aspect, the first SRS resource set is an antenna switching SRS resource set used to indicate downlink channel state information with reciprocity between an uplink and downlink channel, the second SRS resource set is a codebook SRS resource set used to indicate uplink channel state information when a base station indicates an uplink precoder to the UE, and the third SRS resource set is a non-codebook SRS resource set used to indicate uplink channel state information when the UE selects an uplink precoder.

In a second aspect, alone or in combination with the first aspect, the SRS is transmitted on a first antenna port, of the at least two non-coherent or partially-coherent antenna ports, and is transmitted on a second antenna port, of the at least two non-coherent or partially-coherent antenna ports, with a delay that indicates use of cyclic delay diversity for the at least two non-coherent or partially-coherent antenna ports.

In a third aspect, alone or in combination with one or more of the first and second aspects, the delay indicates a maximum delay permitted to be used by the UE for transmitting the PUSCH communication on the virtual port with cyclic delay diversity.

In a fourth aspect, alone or in combination with one or more of the first through third aspects, the delay indicates an actual delay to be used by the UE for transmitting the PUSCH communication on the virtual port with cyclic delay diversity.

In a fifth aspect, alone or in combination with one or more of the first through fourth aspects, the delay used to transmit the SRS is a function of a number of resource blocks assigned to the UE for the PUSCH communication.

In a sixth aspect, alone or in combination with one or more of the first through fifth aspects, the first SRS resource set partially or fully overlaps in time with the second SRS resource set.

In a seventh aspect, alone or in combination with one or more of the first through sixth aspects, the first SRS resource set partially or fully overlaps in time with the third SRS resource set.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving an indication of a sounding reference signal (SRS) resource set to be used to signal a virtual port used for a physical uplink shared channel (PUSCH) communication, wherein the virtual port is a combination of at least two non-coherent or partially-coherent antenna ports of the UE using precoding and cyclic delay diversity; and
   transmitting an SRS for the at least two non-coherent or partially-coherent antenna ports using one or more resources of the SRS resource set.

2. The method of claim 1, wherein the SRS resource set does not overlap in time with another indicated SRS resource set having a different use than the SRS resource set.

3. The method of claim 1, wherein the SRS resource set does not overlap in time with an antenna switching SRS resource set used to indicate downlink channel state information with reciprocity between an uplink and downlink channel.

4. The method of claim 1, wherein the SRS is transmitted on the virtual port using precoding and cyclic delay diversity.

5. The method of claim 1, wherein the SRS resource set partially or fully overlaps in time with another indicated SRS resource set having a different use than the SRS resource set.

6. The method of claim 1, wherein the SRS resource set partially or fully overlaps in time with an antenna switching SRS resource set used to indicate downlink channel state information with reciprocity between an uplink and downlink channel.

7. The method of claim 1, wherein the SRS is transmitted on a first antenna port, of the at least two non-coherent or partially-coherent antenna ports, and is transmitted on a second antenna port, of the at least two non-coherent or partially-coherent antenna ports, with a delay that indicates use of cyclic delay diversity for the at least two non-coherent or partially-coherent antenna ports.

8. The method of claim 7, wherein the delay indicates a maximum delay permitted to be used by the UE for transmitting the PUSCH communication on the virtual port with cyclic delay diversity.

9. The method of claim 7, wherein the delay indicates an actual delay to be used by the UE for transmitting the PUSCH communication on the virtual port with cyclic delay diversity.

10. The method of claim 7, wherein the delay used to transmit the SRS is a function of a number of resource blocks assigned to the UE for the PUSCH communication.

11. The method of claim 1, wherein the SRS resource set has a longer periodicity than an antenna switching SRS resource set used to indicate downlink channel state information with reciprocity between an uplink and downlink channel.

12. The method of claim 1, wherein the SRS resource set is activated for a same duration as the PUSCH communication.

13. A method of wireless communication performed by a user equipment (UE), comprising:
    determining that the UE is configured to use a virtual port for a physical uplink shared channel (PUSCH) communication, wherein the virtual port is a combination of at least two non-coherent or partially-coherent antenna ports of the UE using precoding and cyclic delay diversity;
    determining that the UE is configured with a first sounding reference signal (SRS) resource set that overlaps in time with a second SRS resource set, wherein the first SRS resource set and the second SRS resource set are associated with different uses; and
    transmitting an SRS for the at least two non-coherent or partially-coherent antenna ports using one or more resources of the second SRS resource set or a third SRS resource set configured for the UE.

14. The method of claim 13, wherein:
    the first SRS resource set is an antenna switching SRS resource set used to indicate downlink channel state information with reciprocity between an uplink and downlink channel,
    the second SRS resource set is a codebook SRS resource set used to indicate uplink channel state information when a base station indicates an uplink precoder to the UE, and the third SRS resource set is a non-codebook SRS resource set used to indicate uplink channel state information when the UE selects an uplink precoder.

15. The method of claim 13, wherein the SRS is transmitted on a first antenna port, of the at least two non-coherent or partially-coherent antenna ports, and is transmitted on a second antenna port, of the at least two non-coherent or partially-coherent antenna ports, with a delay that indicates use of cyclic delay diversity for the at least two non-coherent or partially-coherent antenna ports.

16. The method of claim 15, wherein the delay indicates a maximum delay permitted to be used by the UE for transmitting the PUSCH communication on the virtual port with cyclic delay diversity.

17. The method of claim 15, wherein the delay indicates an actual delay to be used by the UE for transmitting the PUSCH communication on the virtual port with cyclic delay diversity.

18. The method of claim 15, wherein the delay used to transmit the SRS is a function of a number of resource blocks assigned to the UE for the PUSCH communication.

19. The method of claim 13, wherein the first SRS resource set partially or fully overlaps in time with the second SRS resource set.

20. The method of claim 13, wherein the first SRS resource set partially or fully overlaps in time with the third SRS resource set.

21. A user equipment (UE) for wireless communication, comprising:
a memory; and
one or more processors operatively coupled to the memory, the memory and the one or more processors configured to:
receive an indication of a sounding reference signal (SRS) resource set to be used to signal a virtual port used for a physical uplink shared channel (PUSCH) communication, wherein the virtual port is a combination of at least two non-coherent or partially-coherent antenna ports of the UE using precoding and cyclic delay diversity; and
transmit an SRS for the at least two non-coherent or partially-coherent antenna ports using one or more resources of the SRS resource set.

22. The UE of claim 21, wherein the SRS resource set does not overlap in time with another indicated SRS resource set having a different use than the SRS resource set.

23. The UE of claim 21, wherein the SRS resource set does not overlap in time with an antenna switching SRS resource set used to indicate downlink channel state information with reciprocity between an uplink and downlink channel.

24. The UE of claim 21, wherein the SRS is transmitted on the virtual port using precoding and cyclic delay diversity.

25. The UE of claim 21, wherein the SRS resource set partially or fully overlaps in time with another indicated SRS resource set having a different use than the SRS resource set.

26. The UE of claim 21, wherein the SRS resource set partially or fully overlaps in time with an antenna switching SRS resource set used to indicate downlink channel state information with reciprocity between an uplink and downlink channel.

27. The UE of claim 21, wherein the SRS is transmitted on a first antenna port, of the at least two non-coherent or partially-coherent antenna ports, and is transmitted on a second antenna port, of the at least two non-coherent or partially-coherent antenna ports, with a delay that indicates use of cyclic delay diversity for the at least two non-coherent or partially-coherent antenna ports.

28. The UE of claim 27, wherein the delay indicates a maximum delay permitted to be used by the UE for transmitting the PUSCH communication on the virtual port with cyclic delay diversity.

29. The UE of claim 27, wherein the delay indicates an actual delay to be used by the UE for transmitting the PUSCH communication on the virtual port with cyclic delay diversity.

30. The UE of claim 27, wherein the delay used to transmit the SRS is a function of a number of resource blocks assigned to the UE for the PUSCH communication.

31. The UE of claim 21, wherein the SRS resource set has a longer periodicity than an antenna switching SRS resource set used to indicate downlink channel state information with reciprocity between an uplink and downlink channel.

32. The UE of claim 21, wherein the SRS resource set is activated for a same duration as the PUSCH communication.

33. A user equipment (UE) for wireless communication, comprising:
a memory; and
one or more processors operatively coupled to the memory, the memory and the one or more processors configured to:
determine that the UE is configured to use a virtual port for a physical uplink shared channel (PUSCH) communication, wherein the virtual port is a combination of at least two non-coherent or partially-coherent antenna ports of the UE using precoding and cyclic delay diversity;
determine that the UE is configured with a first sounding reference signal (SRS) resource set that overlaps in time with a second SRS resource set, wherein the first SRS resource set and the second SRS resource set are associated with different uses; and
transmit an SRS for the at least two non-coherent or partially-coherent antenna ports using one or more resources of the second SRS resource set or a third SRS resource set configured for the UE.

34. The UE of claim 33, wherein:
the first SRS resource set is an antenna switching SRS resource set used to indicate downlink channel state information with reciprocity between an uplink and downlink channel,
the second SRS resource set is a codebook SRS resource set used to indicate uplink channel state information when a base station indicates an uplink precoder to the UE, and
the third SRS resource set is a non-codebook SRS resource set used to indicate uplink channel state information when the UE selects an uplink precoder.

35. The UE of claim 33, wherein the SRS is transmitted on a first antenna port, of the at least two non-coherent or partially-coherent antenna ports, and is transmitted on a second antenna port, of the at least two non-coherent or partially-coherent antenna ports, with a delay that indicates use of cyclic delay diversity for the at least two non-coherent or partially-coherent antenna ports.

36. The UE of claim 35, wherein the delay indicates a maximum delay permitted to be used by the UE for transmitting the PUSCH communication on the virtual port with cyclic delay diversity.

37. The UE of claim 35, wherein the delay indicates an actual delay to be used by the UE for transmitting the PUSCH communication on the virtual port with cyclic delay diversity.

38. The UE of claim 35, wherein the delay used to transmit the SRS is a function of a number of resource blocks assigned to the UE for the PUSCH communication.

39. The UE of claim 33, wherein the first SRS resource set partially or fully overlaps in time with the second SRS resource set.

40. The UE of claim 33, wherein the first SRS resource set partially or fully overlaps in time with the third SRS resource set.

41. A non-transitory computer-readable medium storing instructions for wireless communication, the instructions comprising:
   one or more instructions that, when executed by one or more processors of a user equipment (UE), cause the one or more processors to:
      receive an indication of a sounding reference signal (SRS) resource set to be used to signal a virtual port used for a physical uplink shared channel (PUSCH) communication, wherein the virtual port is a combination of at least two non-coherent or partially-coherent antenna ports of the UE using precoding and cyclic delay diversity; and
      transmit an SRS for the at least two non-coherent or partially-coherent antenna ports using one or more resources of the SRS resource set.

42. A non-transitory computer-readable medium storing instructions for wireless communication, the instructions comprising:
   one or more instructions that, when executed by one or more processors of a user equipment (UE), cause the one or more processors to:
      determine that the UE is configured to use a virtual port for a physical uplink shared channel (PUSCH) communication, wherein the virtual port is a combination of at least two non-coherent or partially-coherent antenna ports of the UE using precoding and cyclic delay diversity;
      determine that the UE is configured with a first sounding reference signal (SRS) resource set that overlaps in time with a second SRS resource set, wherein the first SRS resource set and the second SRS resource set are associated with different uses; and
      transmit an SRS for the at least two non-coherent or partially-coherent antenna ports using one or more resources of the second SRS resource set or a third SRS resource set configured for the UE.

* * * * *